Nov. 12, 1963   J. B. GODSHALK   3,110,287
POULTRY WATERING DEVICES
Original Filed Nov. 6, 1958   2 Sheets-Sheet 1
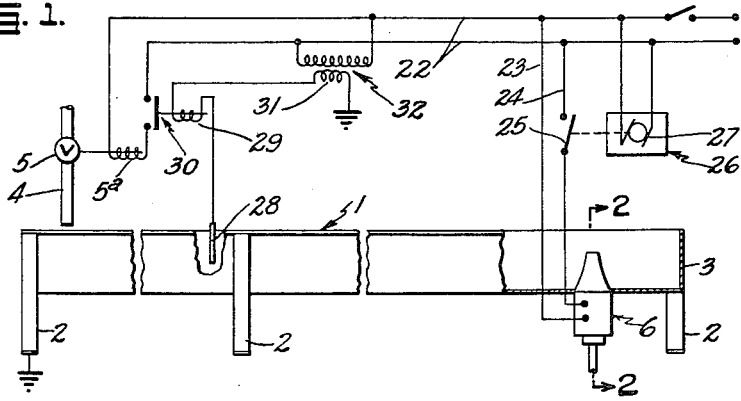
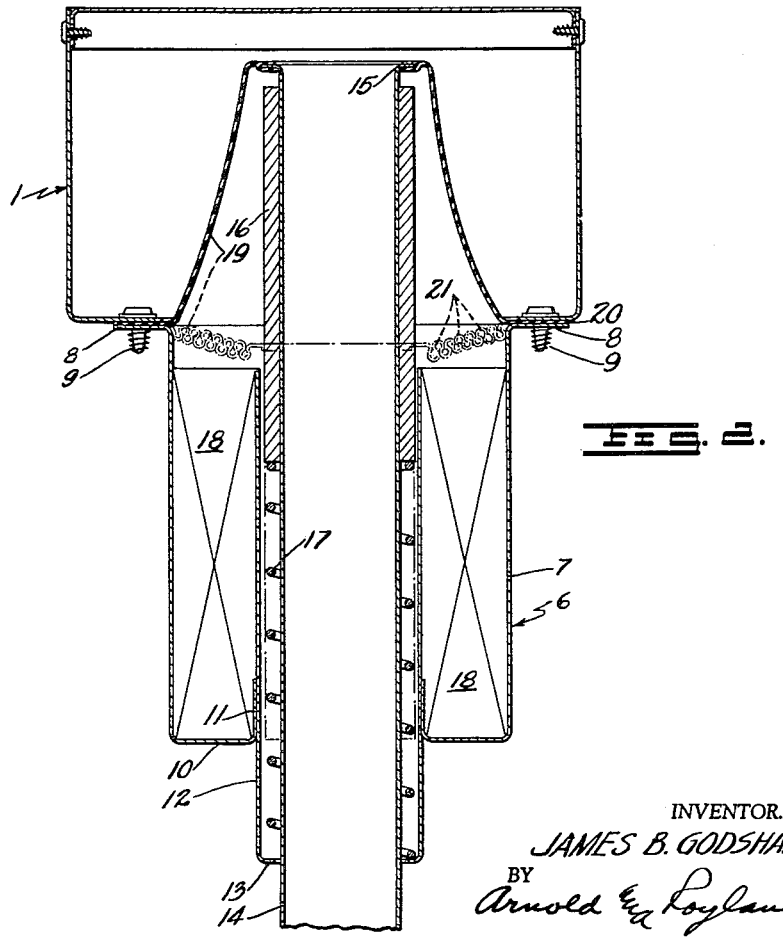
INVENTOR.
JAMES B. GODSHALK
BY
Arnold & Roylance
ATTORNEYS

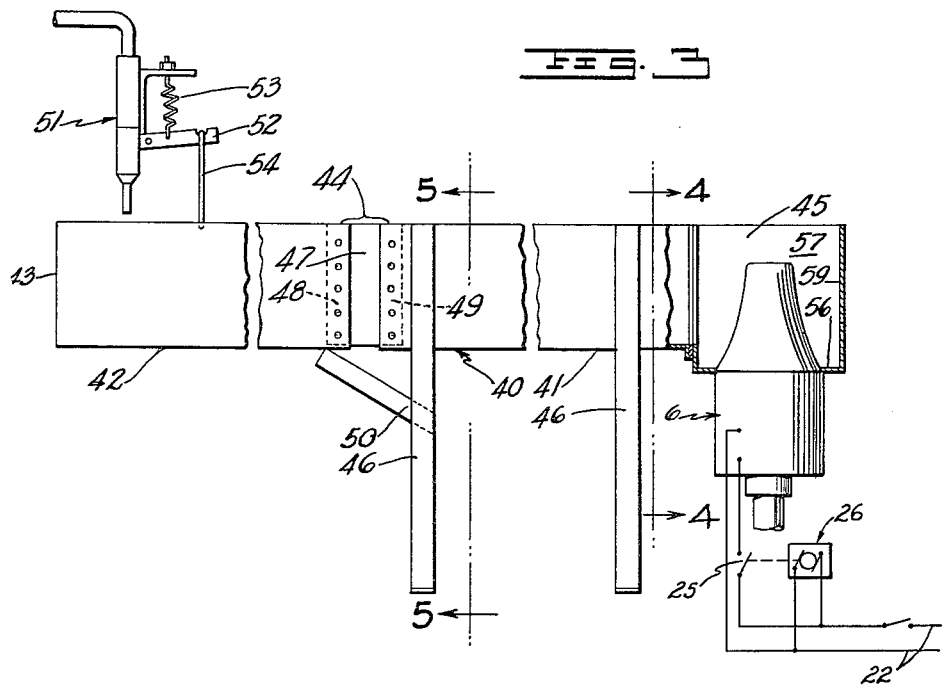
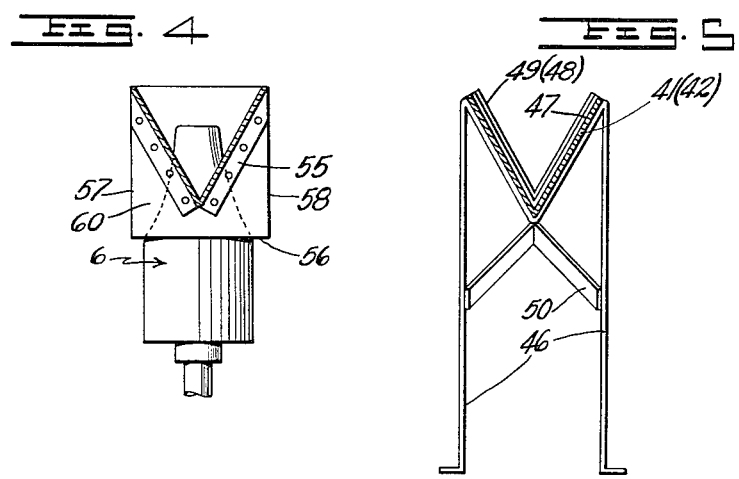

United States Patent Office 3,110,287
Patented Nov. 12, 1963

3,110,287
POULTRY WATERING DEVICES
James B. Godshalk, Chester Spring, Pa., assignor to Fox Products Company, Philadelphia, Pa., a corporation of Pennsylvania
Original application Nov. 6, 1958, Ser. No. 772,213, now Patent No. 3,023,770, dated Mar. 6, 1962. Divided and this application Oct. 31, 1961, Ser. No. 148,917
3 Claims. (Cl. 119—72)

This invention relates to poultry watering devices, such as automatic poultry watering troughs, and to drain and filling features thereof. This application is a division of my copending application Serial Number 772,213, filed November 6, 1958, and now Patent No. 3,023,770.

In the raising of chickens, turkeys, etc., it is now the common practice to employ automatic watering devices including a trough or similar container which is supplied with water via an automatically operated valve to maintain the water at a predetermined level. While such devices are widely used with considerable success, they have the drawback that the trough or other container must be periodically cleaned manually to remove ordinary dirt, drippings, and such other foreign material as may tend to pollute the water and clog the system. To solve this difficulty, it has heretofore been proposed that the water be flowed continually through the trough and thus carry away the dirt and the like. Arrangements to accomplish this have, however, not been satisfactory on a commercial basis because of the tendency for the necessary drain equipment to become clogged so that the troughs overflowed. Further, such arrangements rather drastically increase the water consumption and are therefore uneconomical.

An object of the present invention is to provide an improved poultry watering device having means whereby the trough or other watering container is periodically drained in such fashion as to rapidly flush out the same and therefore accomplish satisfactory cleaning.

Another object is to provide an improved automatic drain mechanism for poultry watering troughs and the like.

A further object is to provide certain valuable improvements in poultry watering equipment which are particularly applicable to situations where very long watering troughs are employed.

In order that the manner in which these and other objects are accomplished in accordance with the invention can be understood in detail, reference is had to the accompanying drawings, which form a part of this specification, and wherein:

FIG. 1 is a view, partly in side elevation with some parts broken away for clarity, and partly diagrammatic, of one embodiment of the invention;

FIG. 2 is an enlarged vertical sectional view, taken on line 2—2, FIG. 1, and illustrating the automatic drain valve of the device of that figure in de-energized condition;

FIG. 3 is an enlarged side elevational view of a poultry watering trough installation embodying a modified form of the invention, parts being broken away and sectioned for clarity;

FIG. 4 is a transverse vertical sectional view taken on line 4—4, FIG. 3; and

FIG. 5 is a transverse sectional view taken on line 5—5, FIG. 3.

Referring now to the drawings in detail, and first to FIG. 1 thereof, it will be seen that the embodiment of the invention here illustrated comprises an elongated, substantially rigid poultry watering trough 1 fabricated from sheet metal and having a generally U-shaped transverse cross-section. Such a trough may be extremely long, as on the order of 100 feet, and is rigidly supported on the floor of the poultry house by means of suitable leg members 2. The trough 1 is, of course, closed at both ends in the usual fashion by end walls, as seen at 3.

Adjacent one end, there is provided a filling device comprising a filling pipe 4 in which is connected a normally closed solenoid actuated valve 5 via which water may be supplied from any suitable source to the trough.

At the opposite end of the trough, the bottom wall thereof is provided with a circular opening at which is mounted an automatic drain device indicated generally at 6. As seen in FIG. 2, the drain device 6 comprises a generally cylindrical, tubular housing 7 having at its top an outwardly directed flange 8 secured to the lower surface of the bottom wall of the trough, as by sheet metal screws 9, so as to be concentric with the drain opening in the bottom of the trough. At its bottom end, the housing 7 is provided with an inturned end flange 10 and a tubular, upwardly directed sleeve portion 11 concentrically disposed inwardly of the main wall of housing 7. Secured to portion 11 in any suitable fashion, as by silver soldering, and extending coaxially with respect to housing 7, is a guide tube 12. Tube 12 extends almost to the top of housing 7 and there terminates in an open end. Tube 12 also extends below bottom end wall 10 of housing 7 and there terminates in an inturned flange 13. Slidably disposed concentrically within guide tube 12 is a metal drain tube 14 terminating at its top end in an outwardly directed annular flange 15. Embracing a major portion of drain tube 14 is a magnetic sleeve 16, of a material such as soft iron, which is fixed to the drain tube, as by silver soldering. Sleeve 16 is of considerable thickness and therefore projects outwardly from drain tube 14. A biasing spring 17 is disposed between the lower end of sleeve 16 and the bottom end flange 13 of guide tube 12. Thus, spring 17 acts under compression between flange 13 and the bottom end of sleeve 16, so biasing drain tube 14 upwardly.

Disposed within the annular space between housing 7 and guide sleeve 12 is an electromagnetic actuating winding 18 which, as will be explained hereinafter, is effective to actuate the drain valve from an upper, closed position, to which the same is biased by spring 17, seen in solid lines in FIG. 2, and a lower, open position, as indicated by phantom lines in FIG. 2.

The annular space between the upper end of drain tube 14 and the bottom wall of the trough is closed by means of an annular, flexible diaphragm 19 having an outer peripheral portion 20 clamped in fluid-tight relation between top end flange 8 of housing 7 and the lower surface of the bottom wall of the trough by the action of sheet metal screws 9. The inner periphery of diaphragm 19 is provided with a continuous slit and the upper end flange 15 of drain tube 14 is disposed within such slit and bonded to the material of the diaphragm in fluid-tight relation. The diaphragm 19 is so made that, when the same is in its relaxed or "normal" position, the main body thereof is disposed in the form of a plurality of concentric, annular folds or corrugations, as indicated at 21. The material from which diaphragm 19 is fabricated is such that, when drain tube 14 is actuated to its uppermost position by spring 17 the folds or corrugations 21 are straightened out and the diaphragm is thus stretched into what may be termed a generally frusto-conical form. When the winding 18 is energized and the device is actuated to the position shown in phantom lines in FIG. 2, the corrugations or folds 21 return, as illustrated. The diaphragm can be of rubber- or resin-impregnated fabric sheet material.

Spring 17 is so designed that, when allowed to extend to its normal or relaxed condition, it is effective to raise elements 14 and 16 to such an extent that the open upper end, at 15, of drain tube 14 is disposed a considerable distance above the bottom wall of trough 1 and just above the level at which water is to be maintained in the trough. The upper, closed position of drain tube 14 can be predetermined by having spring 17 of such strength that diaphragm 19 becomes fully extended and taut, so that the diaphragm constitutes a limit stop acting against the spring force. On the other hand, the arrangement can be made such that spring 17 simply is allowed to relax fully, thus raising the drain tube by a definite distance equal to the difference between the relaxed and compressed lengths of the spring, in which case diaphragm 19 need not be extended to taut condition.

Spring 17 is compressible to such an extent that the drain tube 14 can be lowered, as a result of action of the actuating winding agent 18, to a position where the open upper end 15 thereof is disposed just below the bottom wall of trough 1. With the drain tube in this position, it is obvious that all of the water within the trough will be abruptly drained therefrom via the drain tube 14 and can pass into a suitable receptacle (not shown) or directly to the sewer.

As seen in phantom lines in FIG. 2, the lowermost position of the drain tube 14 is advantageously such that the open top or entry end thereof is disposed just below the bottom will of the trough. When the drain tube is in this position, the diaphragm 19 defines a conical sump through which the water rushes into the drain tube during the rapid draining action. Such an arrangement assures that particles of dirt and the like will be carried forcefully into the drain tube.

In many instances, in order to obtain satisfactory draining and cleaning of the trough, it is only necessary that, in its lowermost position, the top of drain tube 14 be disposed substantially at the bottom of the trough. Particularly where troughs of relatively large capacity are employed, the force of the water passing into the drain tube is such that the dirt and debris will be carried into the drain tube even though the top thereof is disposed slightly above the bottom wall of the trough.

While it is advantageous to employ a construction, as seen in FIG. 2, such that energization of the electromagnetic actuating means causes the drain tube to move downwardly, against the biasing action of spring 17, the opposite situation may pertain. That is, the actuating force of the electromagnetic means may be employed to raise the drain tube to its effectively closed position and to maintain the same in that position. This involves, of course, a reversal of the electromagnetic design of the actuator. While such an arrangement is sometimes less desirable than that of FIG. 2, since it is necessary to maintain the actuating winding in energized condition so long as the trough is in use, except for periods of draining thereof, one advantage does arise from this change. That is the fact that the biasing spring 17 may be eliminated, the drain tube being returned to its lower, open position simply by the action of gravity. Such a gravity return action can be made quite abrupt since the combined weight of the drain tube and the magnetic member 16 is considerable and since the diaphragm 19 applies only a negligible restraining force, if any, to the train assembly. Also, there is of course a distinct hydraulic head on the drain device when the trough is full.

Both the actuating coil 18 of the automatic drain assembly and the actuating coil 5ª of filling valve 5 can be energized from the same power source, as indicated in FIG. 1. Thus, supply conductors 22 are connected to a suitable source of alternating current, on the one hand, and to the terminals of actuating winding 5ª, on the other, the terminals of actuating winding 18 of the drain device being connected across conductors 22 via conductors 23 and 24. In conductor 24, in series with actuating winding 18, there is provided a control switch 25 of conventional form, the switch 25 being periodically actuated by a conventional time clock mechanism indicated diagrammatically at 26 and comprising an electric motor 27 connected across conductors 22. The time clock 26 and switch 25 can be constructed and adjusted in such manner that actuating winding 18 of the drain device of FIG. 2 is energized for a predetermined period one or more times during each 24 hours. Thus, draining and cleaning of the trough 1 is accomplished automatically without requiring attention of the operator.

In order to control the filling valve 5, the apparatus comprises a water level sensing electrode 28 connected in series with winding 29 of a relay 30 and secondary winding 31 of a transformer 32, the other terminal of winding 31 being connected to ground and the trough also being grounded, the primary winding of the transformer being connected across supply conductors 22. Thus, so long as the water within trough 1 is at least at a predetermined level, determined by the position of electrode 28, current will flow through the actuating winding 29 of relay 30, causing that relay to be energized. The contacts of relay 30 are connected in series with winding 5ª of valve 5 and are so arranged that, when energized, the relay is open, interrupting the flow of current to the winding 5ª and so maintaining the valve 5 closed. When the water level in the trough descends to such a point that the sensing electrode 28 is no longer in contact with the water, curernt no longer flows in winding 29 and relay 30 accordingly closes, being biased to close by a suitable spring. Current thus flows to winding 5ª, causing valve 5 to open and supply additional water to the trough.

Throughout most of the operation of the watering device, this action will be effective only to maintain the water in the trough at a desired level. But, at such times as switch 25 is closed to cause the automatic drain device to be moved to its open position, the resulting decrease in the level of water in trough 1 of course causes valve 5 to supply water continuously to the trough. Thus, the action of the automatic drain device is not only to drain the normal amount of water quickly from the trough but also to cause a continuing flow of cleaning water through the trough for such period as switch 25 remains closed. That is, so long as the automatic drain device is in open position, water will be supplied to the trough via valve 5 because sensing electrode 28 is not in contact with water in the trough. During such times, of course, valve 5 will be closed at a time subsequent to the return of the automatic drain device to its upper or effectively closed position, since such actuation of the drain device will result in the trough again being filled to a point where the sensing electrode 28 contacts the water.

FIGS. 3–5 illustrate another embodiment of the invention, employing an automatic drain device constructed in accordance with FIG. 2, but using a mechanically actuated valve to control the flow of water to the trough, both to maintain the trough filled and to provide the necessary water flow to clean the trough when the automatic drain device is in open position.

In this embodiment, the trough 40 comprises a stationary section 41 which is open at both ends, a pivoted section 42 having an end wall at 43 and being connected to section 41 by means of a flexible, water-tight joint 44, and an additional stationary section 45 associated with the automatic drain device 6. Section 41 of the trough 40 may be greatly elongated, on the order of as much as 100 feet in length, and is rigidly supported by legs 46. As indicated in FIG. 5, the flexible joint 44 comprises a length of flexible, water-impervious sheet material 47 formed to the cross sectional shape of the trough and having its ends held in place by means of metal strips 48, 49 attached to trough sections 41, 42, respectively, as by rivets or by other suitable fastening means, in such fashion that the end portions of flexible sheet 47 are clamped to the walls of the trough sections in fluid-tight relation. The end of trough section 42 adjacent section 41 is supported by means of a positioning bracket 50 rigidly secured to one of the leg structures 46, as will be clear from FIGS. 3 and 5.

Adjacent end wall 43, trough section 42 is associated with a weight-operated valve assembly 51. Valve assembly 51 may, for example, be of the type described in Reissue Patent No. 23,447, issued December 25, 1951, to Virgil H. Pruitt, but constructed without a latch element. Thus, the valve assembly includes a valve actuating lever 52, FIG. 3, biased upwardly by a spring 53, trough section 42 being hung from lever 52 by means of a suitable bail or other device 54. As is well known in the art, the operation of this type of valve assembly is such that, when a predetermined amount of water is in the trough, the weight of the water urges lever 52 downwardly, against the biasing action of spring 53, to such an extent that the valve mechanism is shifted to closed position, cutting off the flow of water to the trough. However, when the amount of water in the trough is inadequate, the downward force applied to lever 52 by the weight of the trough and water is insufficient to overcome the biasing action of spring 53, so that the valve is held in open position until such time as the amount of water delivered to the trough fills the same to the desired level.

In this embodiment of the invention, the side walls of the trough 40 are arranged to define an upright V and, at the end of section 41 adjacent section 45, the side walls of section 41 are flanged outwardly, as indicated at 55 in FIG. 4. Section 45 is provided with a flat bottom wall 56, two vertically disposed side walls 57, 58, an end wall 59, and a vertically disposed front wall 60, the latter being provided with a V-shaped notch corresponding in shape and size to the cross section of trough portion 41. End flanges 55 of section 41 are secured in fluid-tight relation to wall 60, so that the upper surfaces of the side walls of section 41 are in substantial alignment with the edges of the V-shaped notch in end wall 60 of section 45. A fluid-tight joint between sections 41 and 45 may be obtained, for example, by providing a gasket between flanges 55 and wall 60.

It will be observed that in both the embodiment of FIG. 1 and the embodiment of FIG. 3, the waterer is so constructed that actuation of automatic drain device 6 will be effective first to quickly drain from the trough the normal amount of water maintained therein and then to provide a continuous flow of water through the trough, by valve 5 on the one hand or valve assembly 51 on the other hand, for such period of time as the automatic drain device remains in open position. In this connection, it is advantageous to so construct and adjust time clock mechanism 26 that switch 25 remains closed, upon each actuation thereof, for a period of time substantially longer than is required to drain the normal contents of the trough through drain tube 14.

While certain advantageous embodiments have been chosen to illustrate the invention, it will be understood by those skilled in the art that various changes and modifications can be made therein without departing from the scope of the invention as defined in the appended claims.

I claim:

1. In a poultry waterer, the combination of an elongated trough comprising a relatively long, stationary section and a relatively shorter section pivotally movable substantially in a vertical plane, and means for supplying water to said trough comprising an automatic filling valve responsive to the weight of water in said movable trough section.

2. In a poultry waterer, the combination of
   an elongated watering trough;
   water supply means including a valve disposed adjacent one end of said trough to supply water thereto,
      said valve constituting the sole water admitting means of the waterer,
      said supply means further including valve control means responsive to the amount of water in said trough and operatively associated with said valve to open the same, allowing water to flow continuously into said one end of said trough, so long as said trough contains less than a predetermined amount of water;
   drain means disposed at the other end of said trough and operatively arranged for actuation between a first condition, in which the trough retains its contents, and a second condition, in which water in the trough is drained therefrom; and
   time controlled actuating means operatively connected to said drain means for periodically actuating the same to said second condition and maintaining the same in said second condition for a predetermined period of time substantially longer than is required to drain said predetermined amount of water from said trough,
   each actuation of said drain means to said second condition by said time controlled actuating means causing the water in said trough to fall below said predetermined amount, whereby said valve is caused to supply additional water to said trough for continuous flushing thereof so long as said drain means remains in said second condition,
   such supply of additional water by said valve continuing, after said drain means has been actuated to said first condition, until said predetermined amount of water is reestablished in said trough.

3. A poultry waterer in accordance with claim 2 and wherein
   said valve is a weight-operated valve, and
   said trough comprises
      a first elongated, fixedly mounted section,
      a second elongated section disposed in general longitudinal alignment with said first section, and
      flexible means interconnecting the adjacent ends of said first and second sections,
   the end of said second section which is most distant from said first section being suspended from said valve, and said flexible means allowing said second section to pivot generally about an axis transverse to said trough.

References Cited in the file of this patent
UNITED STATES PATENTS

| | | |
|---|---|---|
| 1,485,712 | Reynolds | Mar. 4, 1924 |
| 1,820,981 | Le Fever | Sept. 1, 1931 |
| 2,782,760 | Wolfe | Feb. 26, 1957 |
| 2,859,760 | Borell | Nov. 11, 1958 |